United States Patent
Greer

(10) Patent No.: US 10,268,097 B2
(45) Date of Patent: Apr. 23, 2019

(54) MULTI-ZONE ELECTROCHROMIC DEVICE

(71) Applicant: SAGE Electrochromics, Inc., Faribault, MN (US)

(72) Inventor: Bryan D. Greer, Northfield, MN (US)

(73) Assignee: SAGE ELECTROCHROMICS, INC., Faribault, MN (US)

(*) Notice: Subject to any disclaimer, the term of this patent is extended or adjusted under 35 U.S.C. 154(b) by 0 days.

(21) Appl. No.: 15/075,842

(22) Filed: Mar. 21, 2016

(65) Prior Publication Data

US 2016/0202591 A1    Jul. 14, 2016

Related U.S. Application Data

(63) Continuation of application No. 13/790,167, filed on Mar. 8, 2013, now abandoned, which is a continuation-in-part of application No. 13/407,106, filed on Feb. 28, 2012, now abandoned.

(51) Int. Cl.
| | | |
|---|---|---|
| *G02F 1/153* | (2006.01) | |
| *E06B 9/24* | (2006.01) | |
| *G02F 1/155* | (2006.01) | |
| *G02F 1/163* | (2006.01) | |

(52) U.S. Cl.
CPC .......... *G02F 1/1533* (2013.01); *E06B 9/24* (2013.01); *G02F 1/155* (2013.01); *G02F 1/163* (2013.01); *E06B 2009/2464* (2013.01)

(58) Field of Classification Search
CPC ........ G02F 1/163; G02F 1/1533; G02F 1/155; E06B 9/24; E06B 2009/2464
USPC .................. 359/266–276, 265–276
See application file for complete search history.

(56) References Cited

U.S. PATENT DOCUMENTS

| | | | |
|---|---|---|---|
| 4,832,468 A | 5/1989 | Ito et al. | |
| 4,923,289 A | 5/1990 | Demiryont | |
| 5,066,111 A | 11/1991 | Singleton | |
| 5,138,481 A | 8/1992 | Demiryont | |
| 5,444,330 A | 8/1995 | Leventis et al. | |
| 5,805,367 A * | 9/1998 | Kanazawa .............. | B60R 1/088 359/267 |

(Continued)

FOREIGN PATENT DOCUMENTS

| | | |
|---|---|---|
| CN | 1308761 C | 4/2007 |
| CN | 102460292 A | 5/2012 |

(Continued)

OTHER PUBLICATIONS

International Search Report & Written Opinion, dated Jan. 28, 2014, for Application No. PCT/US2013/051479.

(Continued)

*Primary Examiner* — Kristina M Deherrera
(74) *Attorney, Agent, or Firm* — Abel Schillinger, LLP; Robert N. Young

(57) ABSTRACT

In one aspect of the present invention is a substrate comprising multiple, independently controllable electrochromic zones, wherein each of the electrochromic zones share a common, continuous bus bar. In one embodiment, of the electrochromic zones are not completely isolated from each other. In another embodiment, each of the electrochromic zones have the same surface area. In another embodiment, each of the electrochromic zones have a different surface area.

12 Claims, 10 Drawing Sheets

(56) References Cited

U.S. PATENT DOCUMENTS

| | | | |
|---|---|---|---|
| 6,195,196 B1* | 2/2001 | Kimura | G02B 26/001 349/64 |
| 6,317,248 B1 | 11/2001 | Agrawal et al. | |
| 6,707,590 B1 | 3/2004 | Bartsch | |
| 6,995,892 B2 | 2/2006 | Fanton et al. | |
| 7,372,610 B2 | 5/2008 | Burdis et al. | |
| 7,593,154 B2 | 9/2009 | Burdis et al. | |
| 7,710,671 B1 | 5/2010 | Kwak et al. | |
| 7,830,585 B2 | 11/2010 | Widjaja et al. | |
| 7,952,785 B2 | 5/2011 | Karmhag et al. | |
| 7,990,603 B2 | 8/2011 | Ash et al. | |
| 8,004,744 B2 | 8/2011 | Burdis et al. | |
| 9,341,912 B2 | 5/2016 | Shrivastava et al. | |
| 2002/0005977 A1* | 1/2002 | Guarr | G02F 1/155 359/265 |
| 2002/0044331 A1* | 4/2002 | Agrawal | G02F 1/155 359/265 |
| 2002/0135881 A1 | 9/2002 | Rukavina et al. | |
| 2003/0227663 A1 | 12/2003 | Agrawal et al. | |
| 2006/0181772 A1* | 8/2006 | Byers | B60R 1/088 359/512 |
| 2007/0133078 A1 | 6/2007 | Fanton et al. | |
| 2007/0258128 A1 | 11/2007 | Guarr et al. | |
| 2008/0169185 A1 | 7/2008 | Burdis et al. | |
| 2009/0323160 A1 | 12/2009 | Egerton et al. | |
| 2010/0243427 A1 | 9/2010 | Kozlowski et al. | |
| 2011/0061708 A1* | 3/2011 | Huang | G02F 1/15 136/244 |
| 2011/0260961 A1 | 10/2011 | Burdis | |
| 2011/0267672 A1 | 11/2011 | Sbar et al. | |
| 2012/0019889 A1 | 1/2012 | Lamine et al. | |
| 2012/0026573 A1 | 2/2012 | Collins et al. | |
| 2012/0081775 A1 | 4/2012 | Ersman et al. | |
| 2012/0194895 A1 | 8/2012 | Podbelski et al. | |
| 2012/0300280 A1 | 11/2012 | Murphy et al. | |
| 2013/0021659 A1 | 1/2013 | Friedman et al. | |
| 2013/0222877 A1 | 8/2013 | Greer et al. | |
| 2013/0222878 A1 | 8/2013 | Greer et al. | |
| 2014/0177028 A1 | 6/2014 | Shrivastava et al. | |
| 2015/0077829 A1 | 3/2015 | Greer et al. | |
| 2015/0092259 A1 | 4/2015 | Greer et al. | |
| 2016/0202591 A1 | 7/2016 | Greer | |
| 2018/0196323 A1 | 7/2018 | Wang et al. | |

FOREIGN PATENT DOCUMENTS

| | | |
|---|---|---|
| EP | 1297380 B1 | 5/2001 |
| EP | 2561402 A1 | 2/2013 |
| FR | 2957159 A1 | 9/2011 |
| JP | S61229610 A | 10/1986 |
| JP | S6219631 U | 2/1987 |
| JP | H06167724 A | 6/1994 |
| JP | H08-032552 | 2/1996 |
| JP | 2004537755 A | 12/2004 |
| WO | 20030012541 A2 | 2/2003 |
| WO | 2006085258 A2 | 8/2006 |
| WO | 2009000547 A2 | 12/2008 |
| WO | 2009158510 A2 | 12/2009 |
| WO | 2011101427 A1 | 8/2011 |
| WO | 2013130781 A1 | 9/2013 |
| WO | 2014137378 A1 | 9/2014 |
| WO | 2018119095 A1 | 6/2018 |

OTHER PUBLICATIONS

International Search Report and Written Opinion for Application No. PCT/US2013/028283, dated May 13, 2013.

Pahlavan, M., "Adaptable façade with electrochromic material," Architecture and Building Technology Graduate Report, Jan. 2011, 114 pages.

Kondo, Y. et al., "Electrochromic Type E-Paper Using Poly(1H-Thieno[3,4-d] Imidazol-2(3H)-One) Derivatives by a Novel Printing Fabrication Process," Materials, published Dec. 14, 2011, pp. 2171-2182, vol. 4, CH.

International Search Report and Written Opinion for PCT/US2017/067636, dated Apr. 16, 2018, 12 pages.

* cited by examiner

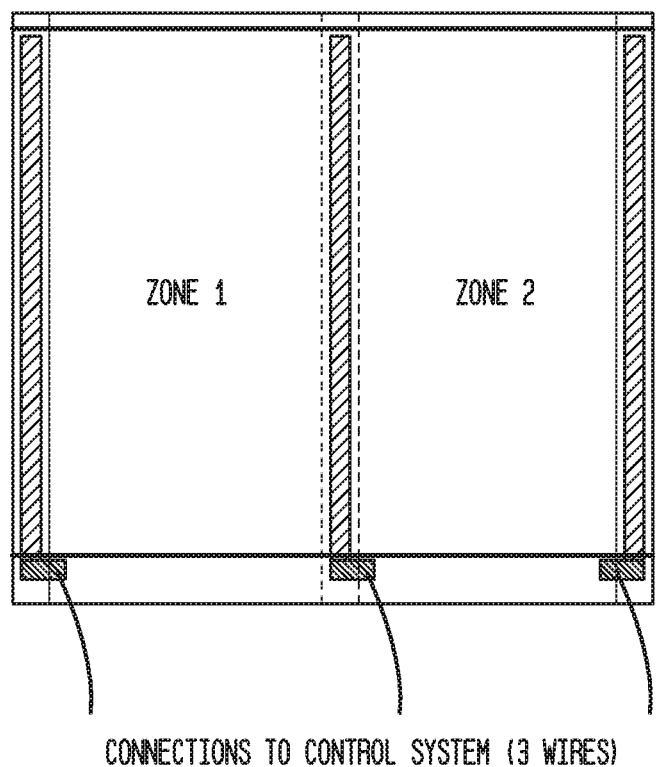

2-PANE, 3-BUSBAR ELECTROCHROMIC DEVICE

3-PANE, 4-BUSBAR ELECTROCHROMIC DEVICE

MULTI-ZONE ELECTROCHROMIC DEVICE

CROSS REFERENCE OF RELATED APPLICATIONS

This application is a continuation of and claims priority under 35 U.S.C. § 120 to U.S. patent application Ser. No. 13/790,167, entitled "MULTI-ZONE ELECTROCHROMIC DEVICE," by Bryan D. Greer, filed Mar. 8, 2013, which is a continuation-in-part of and claims priority under 35 U.S.C. § 120 to U.S. patent application Ser. No. 13/407,106, entitled "MULTI-ZONE ELECTROCHROMIC DEVICE," by Bryan D. Greer, filed Feb. 28, 2012, which applications are assigned to the current assignee hereof and incorporated herein by reference in their entireties.

BACKGROUND OF THE INVENTION

Electrochromic devices include electrochromic materials that are known to change their optical properties, such as coloration, in response to the application of an electrical potential, thereby making the device more or less transparent or more or less reflective. Typical prior art electrochromic devices include a counter electrode layer, an electrochromic material layer which is deposited substantially parallel to the counter electrode layer, and an ionically conductive layer separating the counter electrode layer from the electrochromic layer respectively. In addition, two transparent conductive, layers respectively are substantially parallel to and in contact with the counter electrode layer and the electrochromic layer. Materials for making the counter electrode layer, the electrochromic material layer, the ionically conductive layer and the conductive layers are known and described, for example, in U.S. Patent Application No. 2008/0169185, incorporated by reference herein, and desirably are substantially transparent oxides or nitrides. When an electric potential is applied across the layered structure of the electrochromic device, such as by connecting the respective conductive layers to a low voltage electrical source, ions, such as Li+ ions stored in the counter electrode layer, flow from the counter electrode layer, through the ion conductor layer and to the electrochromic layer. In addition, electrons flow from the counter electrode layer, around an external circuit including a low voltage electrical source, to the electrochromic layer so as to maintain charge neutrality in the counter electrode layer and the electrochromic layer. The transfer of ions and electrons to the electrochromic layer causes the optical characteristics of the electrochromic layer, and optionally the counter electrode layer in a complementary EC device, to change, thereby changing the coloration and, thus, the transparency of the electrochromic device.

FIGS. 1A and 1B illustrate plan and cross-sectional views, respectively, of a typical prior art electrochromic device 20. The device 20 includes isolated transparent conductive layer regions 26A and 26B that have been formed on a substrate 34, such as glass. In addition, the device 20 includes a counter electrode layer 28, an ion conductive layer 32, an electrochromic layer 30 and a transparent conductive layer 24, which have been deposited in sequence over the conductive layer regions 26. It is to be understood that the relative positions of the electrochromic and counter electrode layers of the device 20 may be interchanged. Further, the device 20 includes a bus bar 40 which is in contact only with the conductive layer region 26A, and a bus bar 42 which may be formed on the conductive layer region 2612 and is in contact with the conductive layer 24. The conductive layer region 26A is physically isolated from the conductive layer region 26B and the bus bar 42, and the conductive layer 24 is physically isolated from the bus bar 40. Although an electrochromic device may have a variety of shapes, such as including curved sides, the illustrative, exemplary device 20 is a rectangular device with the bus bars 40 and 42 extending parallel to each other, adjacent to respective opposing sides 25, 27 of the device 20, and separated from each other by a distance W. Further, the bus bars 40 and 42 are connected by wires to positive and negative terminals, respectively, of a low voltage electrical source 22 (the wires and the source 22 together constituting an "external circuit").

Referring to FIGS. 1A and 1B, when the source 22 is operated to apply an electrical potential across the bus bars 40, 42, electrons, and thus a current, flows from the bus bar 42, across the transparent conductive layer 24 and into the electrochromic layer 30. In addition, if the ion conductive layer 32 is an imperfect electronic insulator as is the case in many thin film EC devices, a small current, commonly referred to as a leakage current, flows from the bus bar 42, through the conductive layer 24 and the electrochromic layer 30, and into the ion conductive layer 32. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. As the current flows away from the bus bar 42 across the conductive layer 24 and towards the bus bar 40, voltage is dropped by virtue of the finite sheet resistance of the conductive layer 24, which is typically about 10-20 Ohms/square. In addition, current flowing across the conductive layer 24 is incrementally reduced, as current is drawn through the combination of the layers 30, 32 and 28 ("stack") to produce the electrochromic coloration in the device 20.

Consequently, it is believed that if the device 20 is considered to be formed from successive adjacent segments arranged between the bus bars 40, 42 and extending between the transparent conductor layer 24 and the conductive layer region 26B, the amount of current flowing through the stack at the segment of the conductive layer 24 closest to the bus bar 40 will be close to zero, as the majority of the current will have passed down through the stack. Assuming that the sheet resistance of the transparent conductive layer 24 is substantially uniform between the bus bars 40 and 42, the voltage drop across the transparent conductive layer 24 extending between the bus bars 40, 42, will be proportional to the current flowing through each successive segment, of the device 20. Thus, the rate of voltage drop in the transparent conductive layer with respect to distance away from the bus bar will be at a maximum closest to the bus bar 42 and practically zero close to the bus bar 40. A substantially mirrored image of the current flow occurs with respect to the flow of current from the bus bar 40 across the conductive layer region 26A and toward the bus bar 42, in that the current flow across the device 20 in the conductive layer region 26A increases from the bus bar 40 to the bus bar 42 as a result of contributions from successive segments of the device 20. The difference between the voltage profiles for the conductive layer 24 and the conductive layer region 26A, across the width of the device between the bus bars 40, 42, is the potential difference between the conductive layer 24 and the conductive layer region 26A across the width of the electrochromic device extending between the bus bars 40, 42.

The potential difference determines the maximum rate of current flow through each segment from the counter electrode layer 28 to the electrochromic layer 30 causing the device 20 to transform to a colored state and, thus, causing coloring of the device 20. Current will flow at a rate proportional to the potential difference across the segments of the device, provided there is a ready supply of charge, in the form of lithium ions and electrons, to satisfy the requirements. The net result is that a non-uniform coloration is initially produced, with the regions closest to the bus-bars, where the potential difference between the transparent conductors is largest, coloring faster than the region in the middle of the device. In an ideal device, which would not have any leakage current, this non-uniformity will even out as the supply of available charge in the counter electrode layer is exhausted, first closest to the bus-bars, and then in the center of the device, as the electrochromic device attains a fully colored state, thereby yielding uniform coloration across the entire area of the device.

After a voltage is initially applied across the bus bars 40, 42 of the electrochromic device 20, the current flowing through the device 20 will drop towards zero, and thus the voltage drops across each of the transparent conductive layers will also approach zero. Whether the voltage between the conductive layer 24 and the conductive layer region 26A, across the width of the electrochromic device 20 extending between the bus bars 40, 42, will become equal or substantially equal to a constant, such as about the applied voltage, in the fully colored state, thereby ultimately yielding a relatively uniform coloration in the electrochromic device 20, however, depends in part upon the width of the conductive layer 24 and the conductive layer region 26A of the electrochromic device 20 extending between the bus bars 40, 42 across which the current flows and the magnitude of the leakage current through the device.

In large sized electrochromic devices having a construction similar to that of the device 20, where the current flows a relatively large distance, such as in excess of about 40 inches, across the conductive layers of the electrochromic device between the opposing bus bars, non-uniform coloration of the device may persist even at full coloration, because a large and non-uniform voltage drop occurs through the stack across the width of the conductive layers extending from the opposing bus bars. This non-uniform voltage drop is caused by the effects of leakage current through the device, which is typically present in electrochromic devices because of the thin-film construction of the layers of the stack. Leakage current flows through the stack, such that a potential difference variation is created across the width of the electrochromic device extending between the bus bars. If the leakage current is significantly large, the potential difference variation becomes sufficiently large to cause a non-uniform coloration in the electrochromic device that may be visible to the naked eye. The non-uniform coloration in the electrochromic device typically results in a lighter area near a region midway between the opposing bus bars ("middle region"), than at regions of the electrochromic device near the bus bars. In other words, the middle region of the electrochromic device does not experience the same color change, or the same amount of darkening or consistency of darkening, as those regions closer to the bus bars at the sides of the electrochromic device.

It is has been observed that when electrochromic devices constructed similar to the device 20 are operated at normal operating voltages, such as between around 2.5V and 4.0V, the leakage current is on the order of 50-500 mA/m², such that non-uniform coloration across the electrochromic device may become visible to a naked eye when the distance between the opposing bus bars is at least about 30 inches. For typical leakage current levels, color non-uniformity is not readily apparent to the naked eye when the electrochromic device is in the fully colored state and has bus-bar separations less than about 30 inches.

Referring to FIG. 1A, it is highly desirable to position the bus bars 40, 42 very close to the sides 25, 27 of the device 20 to maximize the region of the device 20, which is between the bus bars 40, 42 and, thus, in which coloration can be controlled. Also, by positioning the bus bars near the sides of the device 20, the bus bars, which typically have a thickness of not more than about 0.25 inches, are not visible or are minimally visible, such that the device is aesthetically pleasing when installed in a typical window frame. Large sized electrochromic devices, in which the distance between the bus bars, which typically are at opposing sides of the device, is in excess or about 40 inches, are desirable for many applications, such as a window of an office building or a glass windshield of a car. Thus, in the operation of such large sized electrochromic devices, non-uniform coloration may occur due to the effects of leakage currents, as discussed above, which is not desirable.

Also, it has been observed that, in large sized electrochromic devices similar to the device 20, the regions of the device adjacent to the opposing bus bars change color or darken more quickly than at a middle region between the bus bars. Further, it has been observed that these same large sized electrochromic devices may change transmission state (or color) more slowly than electrochromic devices having smaller distances between opposing bus bars. This phenomenon is largely due to the current draw in the larger device being larger, and therefore leading to a larger voltage drop in the transparent conductor layers, thereby reducing the net potential applied to the stack relative to an electrochromic device having a smaller width between opposing bus bars. Also, the slower change in coloration is based, in part, on the application of a voltage to the electrochromic device which is below a maximum level, such as 3V, to avoid overdriving of the electrochromic device at the portions near the bus bars, which may cause damage to the layers of the stack.

For example, for a prior art electrochromic device similar to the device 20 having opposing bus bars separated by about six inches, the typical time for the device to change from a full transmission state (fully clear) to a colored state where only five percent of light is transmitted through the device is about 100 seconds, whereas for an electrochromic device similar to the device 20 having bus bars separated by about thirty inches the typical time for obtaining the same coloration change may be about as much as 400 seconds.

US Publication No. 2011/0260961 discloses a three-bus electrochromic device, wherein the two zones formed are not independently controllable.

US Publication No. 2009/0323160 discloses a zoned electrochromic device comprising an area between two adjacent dynamic electrochromic zones which electrically isolates the two adjacent dynamic electrochromic zones. In other words, this publication discloses zones which are completely isolated.

SUMMARY OF THE INVENTION

In one aspect of the present invention is a substrate comprising multiple, independently controllable electrochromic zones, wherein each of the electrochromic zones share a common, continuous bus bar. In one embodiment, of the electrochromic zones are not completely isolated from each other. In another embodiment, each of the electrochromic zones have the same surface area. In another embodiment, each of the electrochromic zones have a different surface area. In some embodiments, the substrate is a laminate. In some embodiments, the electrochromic zones comprise at least one thin film comprising a mixed tungsten-nickel oxide.

In another embodiment, the substrate comprises three bus bars. In another embodiment, the three bus bars are spaced such that a interior bus bar is sandwiched between a first end bus bar and a second end bus bar. In another embodiment, a first electrochromic zone is defined by the space between the interior bus bar and the first end bus bar and a second electrochromic zone is defined by the space between the interior bus bar and the second bus bar. In another embodiment, the electrochromic zones are formed from a single electrochromic coating on the substrate. In another embodiment, the three bus bars are substantially parallel to each other. In another embodiment, the three bus bars run substantially the length of the substrate and each of the three bus bars are approximately the same size. In some embodiments, the substrate is a laminate. In some embodiments, the electrochromic zones comprise at least one thin film comprising a mixed tungsten-nickel oxide.

In another embodiment, the electrochromic zones are formed from a single electrochromic coating on the substrate, wherein the single electrochromic coating is cut to form individual electrochromic zones. In another embodiment, the substrate comprises a first bus bar and a second bus bar, wherein the first bus bar runs continuously over each electrochromic zone. In another embodiment, the second bus bar is formed from a single bus bar and cut to form individual bus bar segments, wherein each bus bar segment corresponds to an electrochromic zone.

In yet another embodiment, both bus bars are cut into multiple segments, but in different places, to create multiple electrochromic zones. This is believed to be especially useful in creating a 3-zone device by cutting each bus bar into two segments. But this is just not limited to 3-zone devices (e.g. can be applied to two zone devices or devices having more than three zones). In some embodiments, the electrochromic zones comprise at least one thin film comprising a mixed tungsten-nickel oxide. In some embodiments, the electrochromic zones are deposited on a substrate which a laminate.

In another embodiment, the substrate is selected from the group consisting of glass, plastic, and a laminate of two of the same or different materials. In another embodiment, the substrate is a window pane or window assembly. In another embodiment, the substrate is a part or an insulated glass unit.

In another embodiment, each of the multiple electrochromic zones comprise: a first electrode comprising one of an electrochromic layer or a counter electrode layer, a second electrode comprising other of the electrochromic layer or the counter electrode layer, an ion-conductor layer for conducting ions between the first and second electrodes, a first conductive layer, and a second conductive layer, the first and second electrodes and the ion-conductor layer being sandwiched between the first and second conductive layers.

In another aspect of the present invention is a method of forming a substrate having multiple electrochromic zones comprising: (1) depositing an electrochromic coating on the substrate, and (2) depositing multiple bus bars on the electrochromic coating so as to form multiple electrochromic zones from the electrochromic coating, wherein the formed multiple electrochromic zones share at least one common continuous bus bar. In one embodiment, the method comprises depositing at least three bus bars such that the spacing of the at least three bus bars forms at least two electrochromic zones. In another embodiment, the electrochromic coating is cut to form two electrochromic zones.

In another aspect of the present invention, is a method of controlling a multi-zone electrochromic device.

In another aspect of the present invention, is a method of installing a multi-zone electrochromic device, or an IGU comprising a multi-zone electrochromic device, in a vehicle or building.

In one aspect of the present invention is a substrate comprising multiple independently controllable electrochromic zones and at least two bus bars, wherein each bus bar is segmented, and wherein at least two adjacent electrochromic zones share a continuous portion of at least one of the bus bars. In some embodiments, the substrate is a laminate. In some embodiments, the electrochromic zones comprise at least one thin film comprising a mixed tungsten-nickel oxide.

In another aspect of the present invention is substrate comprising at least three independently controllable electrochromic zones, the electrochromic zones being arranged sequentially, and wherein no more than any two adjacent electrochromic zones share a continuous portion of at least one of the bus bars. In some embodiments, the substrate comprises three independently controllable electrochromic zones. In some embodiments, adjacent first and second zones share a common portion of a first segmented bus bar and wherein adjacent second and third zones share a common portion of a second segmented bus bar. In some embodiments, each of the electrochromic zones have different surface areas. In some embodiments, each of the electrochromic zones are not completely isolated from each other. In some embodiments, the electrochromic zones are formed from a single electrochromic coating on the substrate. In some embodiments, the first and second segmented bus bars are substantially parallel to each other. In some embodiments, collective portions of the first segmented bus bar and collective portions of the second segmented bus bar run substantially the length of the substrate. In some embodiments, the substrate is a laminate. In some embodiments, the electrochromic zones comprise at least one thin film comprising a mixed tungsten-nickel oxide.

In some embodiments, the substrate comprises four independently controllable electrochromic zones. In some embodiments, adjacent first and second zones share a common portion of a first segmented bus bar and adjacent third and fourth zones share a common portion of a second segmented bus bar. In some embodiments, the substrate is a laminate. In some embodiments, the electrochromic zones comprise at least one thin film comprising a mixed tungsten-nickel oxide.

In another aspect of the present invention is a method of forming a substrate having at least two independently controllable electrochromic zones comprising: (1) depositing an electrochromic coating on a substrate; and (2) depositing two bus bars on the electrochromic coating, wherein at least one of the bus bars are discontinuous, each having at least two portions. In some embodiments, the substrate is a laminate. In some embodiments, the substrate comprises three electrochromic zones. In some embodiments, first and second zones share a common portion of a first segmented bus bar and wherein adjacent second and third zones share a common portion of a second segmented bus bar. In some embodiments, each of the electrochromic zones have different surface areas. In some embodiments, each of the electrochromic zones are not completely isolated from each other. In some embodiments, the electrochromic zones are formed from a single electrochromic coating on the substrate. In some embodiments, the substrate comprises four electrochromic zones. In some embodiments, the electrochromic zones comprise at least one thin film comprising a mixed tungsten-nickel oxide.

In another aspect of the present invention is an electrochromic device comprising a substrate wherein the substrate comprises multiple independently controllable electrochromic zones and at least two bus bars, wherein each bus bar is segmented, and wherein at least two adjacent electrochromic zones share a continuous portion of at least one of the bus bars. In some embodiments, the electrochromic zones comprise at least one thin film comprising a mixed tungsten-nickel oxide.

In another aspect of the present invention is an electrochromic device comprising a substrate wherein the substrate comprises at least three independently controllable electrochromic zones, the electrochromic zones being arranged sequentially, and wherein no more than any two adjacent electrochromic zones share a continuous portion of at least one of the bus bars. In some embodiments, the electrochromic zones comprise at least one thin film comprising a mixed tungsten-nickel oxide.

In another aspect of the present invention is an insulated glazing unit comprising an electrochromic device wherein the electrochromic devices comprises a substrate wherein the substrate comprises multiple independently controllable electrochromic zones and at least two bus bars, wherein each bus bar is segmented, and wherein at least two adjacent electrochromic zones share a continuous portion of at least one of the bus bars. In some embodiments, the electrochromic zones comprise at least one thin film comprising a mixed tungsten-nickel oxide.

In another aspect of the present invention is an insulated glazing unit comprising an electrochromic device wherein the electrochromic device comprises a substrate wherein the substrate comprises at least three independently controllable electrochromic zones, the electrochromic zones being arranged sequentially, and wherein no more than any two adjacent electrochromic zones share a continuous portion of at least one of the bus bars. In some embodiments, the electrochromic zones comprise at least one thin film comprising a mixed tungsten-nickel oxide.

BRIEF DESCRIPTION OF THE DRAWINGS

FIG. 3A is a top plan view of a multi-zone electrochromic device.

DETAILED DESCRIPTION

In one aspect of the present invention is a substrate comprising multiple, independently controllable electrochromic zones, wherein each of the electrochromic zones share a common, continuous bus bar. In one embodiment, each of the electrochromic zones are not completely isolated from each other. In some embodiments, each of the electrochromic zones may have the same or different sizes and/or surface areas. In other embodiments, each of the electrochromic zones may have the same or different shapes (including curved or arcuate shapes).

Generally, the multi-zone EC devices of the present invention fall into two categories: (1) those comprising two bus bars at the opposing sides or edges of an EC device and additional bus bars positioned in an interior spaced between the opposing side or edge bus bars; and (2) those where electrochromic zones are formed from a single electrochromic coating on a substrate, wherein the single electrochromic coating is cut to form individual electrochromic zones. Each of these types of multi-zone EC devices, and their respective processes of fabrication, are discussed herein.

It is believed that multi-zone electrochromic devices according to the present invention provide many advantages over conventional dynamic IGUs, such as permitting optimized harvesting of natural daylight through one or more dynamic zones, while being able to maximize solar-control advantages in the other dynamic zones of the window. Different dynamic zones can be created at any arbitrary distance from the edge of a window in order to satisfy diverse design goals and requirements.

In one aspect of the present invention is a multi-zone electrochromic device where, in addition to bus bars disposed at the opposing sides of an EC device, additional bus bars are positioned in an interior space between the opposing side bus bars. In one embodiment, an interior bus bar is positioned between a first end opposing bus bar and a second end opposing bus bars. Of course, the present invention is not limited no embodiments where multi-zone EC devices comprise three bus bars and hence two zones. Multi-zone EC devices comprising four or more bus bars (having three or more zones, respectively) are equally contemplated.

Figure 1A:
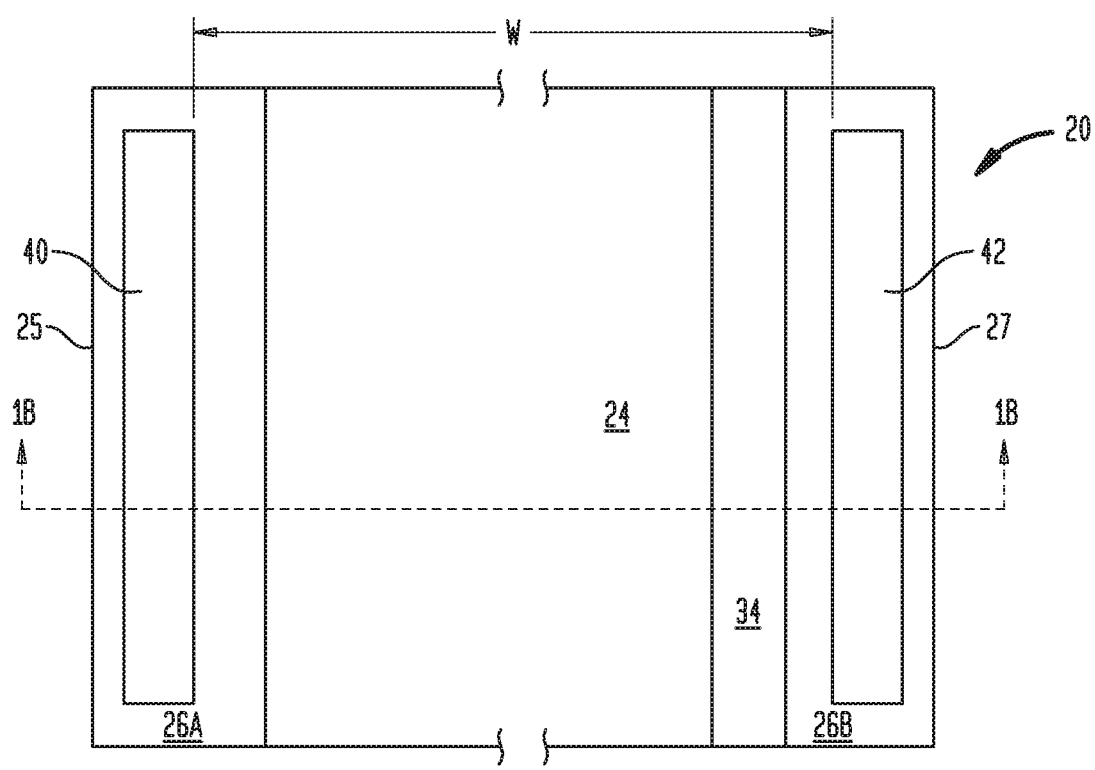
FIG. 1A is a top plan view of a prior art electrochromic device.
Figure 1B:
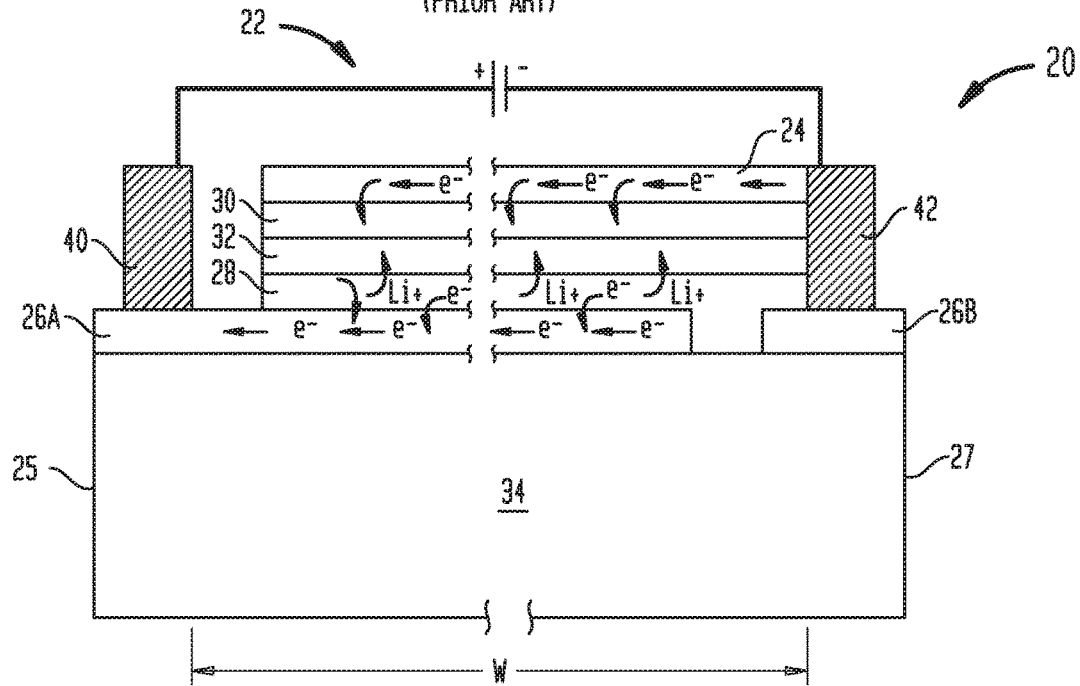
FIG. 1B is a view of the electrochromic device of FIG. 1A at cross-sectional line 1B-1B.
Figure 2:
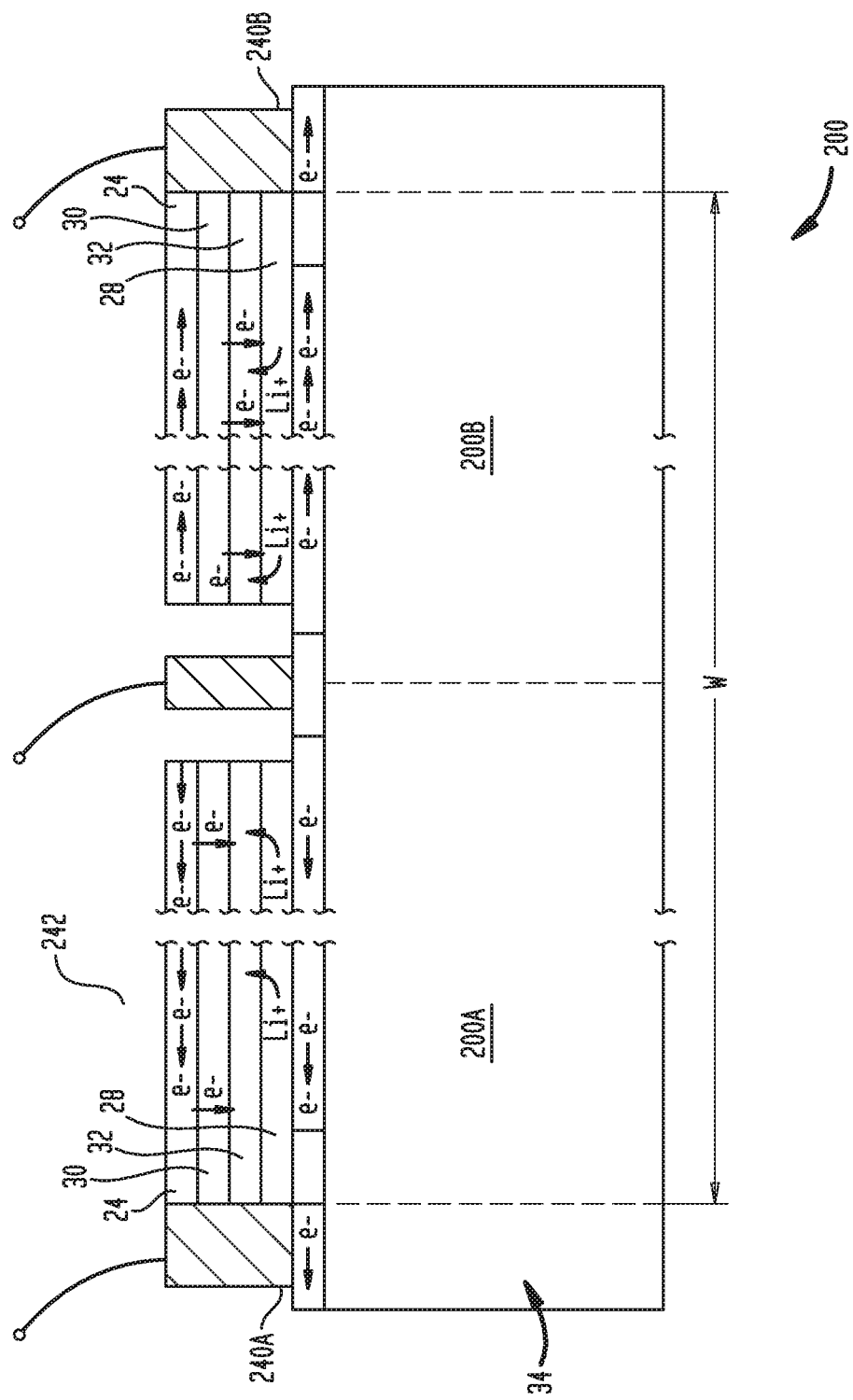
FIG. 2 is a cross-sectional view of a multi-zone electrochromic device.

For example, referring to FIG. 2, a multi-zone electrochromic device 200 includes two independently operable and controllable zones, namely 200A and 200E (or electrochromic device zones). An exemplary multi-zone EC device 200 may include a central bus bar 242 and bus bars 240A and 240B at the opposing sides or edges of the respective zones ("outside bus bars" or "first and second opposing end bus bars"). The interior bus bar 242 is common to both of zones 200A and 200B of the multi-zone PC device 200. Accordingly, a first electrochromic zone 200A is defined by the space between the interior bus bar 242 and the first end bus bar 240A and a second electrochromic zone 200B is defined by the space between the interior bus bar 242 and the second end bus bar 240B.

In this particular embodiment of FIG. 2, the interior bus bar is positioned at a central location relative to the first and second end opposing bus bars. However, the interior bus bar may be present at any position between the first and second end opposing bus bars. The bus bars 242 and 240A and 240B may be separated by the same or different distances. In some embodiments, the bus bar 242 is in a central region of the device and is positioned equidistant from each of bus bars 240A and 240B. In other embodiments, the bus bar 242 is positioned between the bus bars 240A and 240B, but the distance between 242 and 240A is different than the distance between 242 and 240B.

In embodiments having more than two zones, the additional interior bus bars may be positioned at any location between the first and second end opposing bus bars. For example, the additional interior bus bars comprising a device having more than two zones may be placed at equidistant intervals between the first and second end opposing bus bars. It is believed that this may result in a device having multiple zones, where each zone has about the same surface area. Alternatively, the additional interior bus bars comprising a device having more than two zones may be placed at different distances between the first and second opposing end bus bars, resulting in zones having different surface areas.

The multi-zone device fabricated on a single substrate (e.g. glass or plastic). In some embodiments, the multi-zone electrochromic device is produced from a single continuous EC device (i.e. a single continuous stack of thin films deposited on a glass substrate). In other embodiments, two EC devices are independently deposited on a glass substrate, which each individually deposited. EC device has a single bus bar at a side or edge and whereby an interior bus bar is deposited and shared between both devices. For example, a first device 20 is disposed adjacent to and in mirror image to a second device 20, such that the bus bars 42 of the respective first and second devices 20 contact each other. The compositional layers comprising an EC device and their method of formation or deposition are disclosed in U.S. Pat. Nos. 8,004,744, 7,830,585, 7,593,154, 7,372,610, the disclosures of each are hereby incorporated by reference herein in their entirety. For example, techniques for forming the layers of an electrochromic zone or an electrochromic device in a well-known manner generally comprise physical vapor deposition, sputtering, pyrolytic-coating techniques, wet-chemical techniques, such as a sol gel process, spin-coating techniques, and vacuum-coating techniques.

Figure 3B:
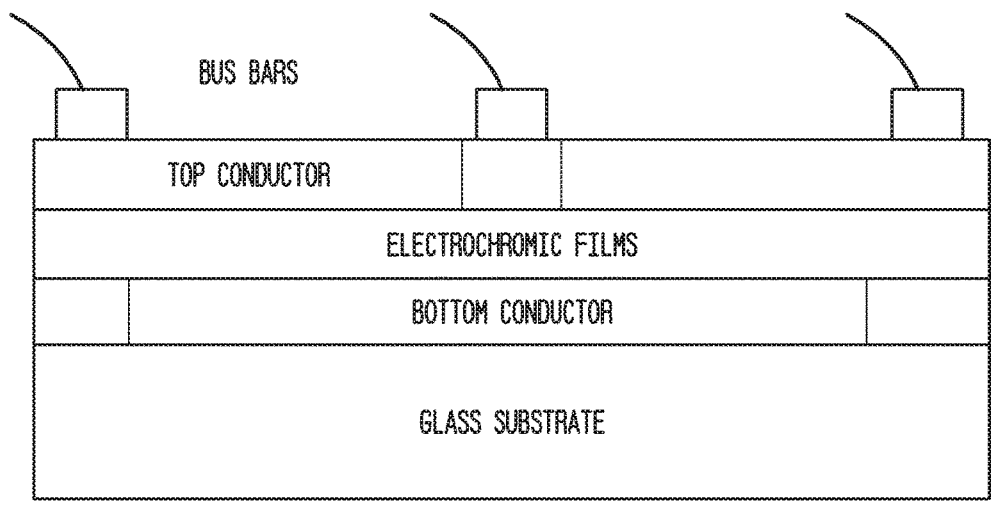
FIG. 3B is a cross-sectional view of a multi-zone electrochromic device.

In some embodiments, the glass substrate is coated with a bottom transparent conductor. This conductor is then cut with a P1 process to isolate different regions of the coatings, as shown in FIGS. 3A and 3B. Next, the electrochromic films are coated over the top, followed by the upper transparent conductive film. Those skilled in the art will recognize that additional optical coatings or functional coatings, such as anti-reflective coatings and reflective or tinted coatings for color-matching, or barrier coatings such as those which prevent migration of moisture from the environment or sodium ions from the glass may additionally be included above or below either of the top or bottom transparent conductors.

At the end of the process, a last laser process makes the depicted. P3 cuts (through the top conductor but not the bottom conductor) and the depicted P4 cuts (through both conductors) to finish isolating the films into the desired zones. Bus bars are applied to the glass, followed by any additional process required (e.g., heating steps to fire the bus bars or films). Lasers that are suitable for producing the cuts or ablation lines include solid-state lasers, such as Nd:YAG at a wavelength of 1064 nm, and excimer lasers, such as ArF and KrF excimer lasers respectively emitting at 243 nm and 193 nm. Other solid-state and excimer lasers are also suitable.

Once deposition or the films comprising the EC stack/EC device and once the bus bars are deposited on the stack, the single pane of glass is fabricated into a laminate or insulated-glass unit. Methods of creating a laminate comprising an EC device are disclosed in US Patent Publication No. 20110267672, the disclosure of which is hereby incorporated by reference herein in its entirety. As part of this fabrication process, wires will be attached to the solder tab portion of each bus bar (see, for example, copending application U.S. Ser. No. 61/490,291, the disclosure of which is incorporated by reference herein).

Because the two (or more) electrochromic zones are not completely independent, but share a common bus bar, it is not possible to simply connect two channels of a standard electrochromic control system to the glass. A typical electrochromic control system will have a bridge-type output, in which the output voltage is varied between +57 and −5V using only positive voltages, by varying which connection is at ground potential. For example, applying ground (0V) to the negative wire and 3V to the positive wire yields a positive 3V to an electrochromic pane, but reversing the two and applying 37 to the negative wire and ground (0V) to the positive wire yields −3V to the pane.

Figure 4A:
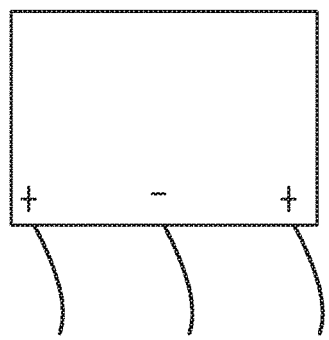
FIG. 4A depicts an electrochromic device having two zones and three wires.
Figure 4B:
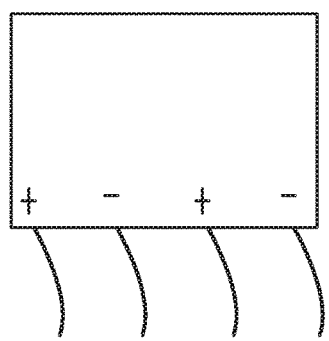
FIG. 4B depicts an electrochromic device having three zones and four wires.

The solution for multi-zone EC devices having three zones is to add up the required voltage for each pane and determine the correct potential to apply to each wire (see, e.g., FIG. 4A). If one skilled in the art were to apply 4V to the first wire, 2V on the second, and 0V on the third, the result would be +2V on the first pane and −2V on the second pane. In this way, the two panes can be completely independently controlled. Generally, the control system must be capable of applying up to twice the voltage required of a single-zone controller, however. Similar logic applies to other multi-zone EC devices having more than two zones, such as four bus bar, three zone devices.

Another example is a 3-zone (4-busbar) device in which it is desired to tint the first two panes at +3V, and clear the third at −2V. If the polarity of the bus bars in sequence is +/−/+/−, we can apply 3V, 0V, 3V, and 5V with respect, to ground. The difference between the first two is 3−0=3; between the second and third is 3−0−3; and between the third and fourth is 3−5=−2. Note that for the purpose of driving the electrochromic device, the absolute potential with respect, to ground is less important, as opposed to the difference between potentials at adjacent bus bars. As such 4V, 1V, 4V and 6V, respectively, could have been applied to achieve the same result.

Current monitoring in each sub-pane is also believed to be more complicated in standard, single zone EC devices. In the 2-zone, 3-busbar case, the two outside wires may be monitored to determine the current in each sub-pane, whereas the middle wire carries the sum of the two currents. The 3-zone, 4-busbar case is more complicated yet. Here, the first wire carries the current of the first zone and the fourth wire carries the current of the third zone (see, e.g., 4B). But to determine the current flowing in the second (middle) zone, it is necessary to calculate the difference in current between either the first and second wires, or between the third and fourth wires.

Figure 7:
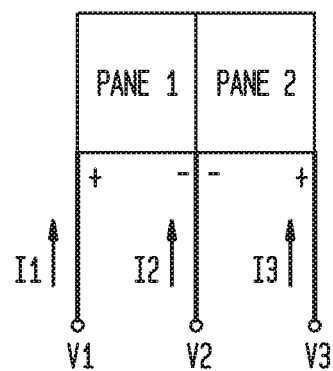
FIG. 7 depicts a 2-pane, 3-busbar electrochromic device, showing the three electrical connections with applied voltages and currents.

Referring to FIG. 7, for this 2-pane, 3-busbar IGU, Pane 1 has an applied voltage given by (V1-V2) and current I1, while Pane 2 has applied voltage of V3-V2 and current I3.

Figure 8:
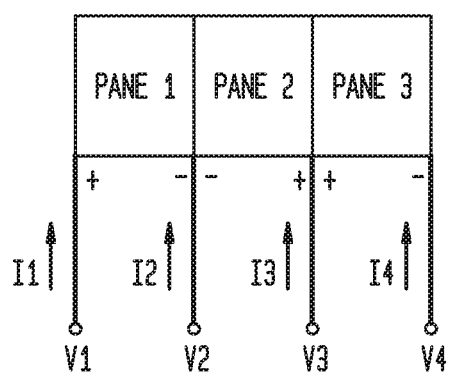
FIG. 8 depicts a 3-pane, 4-busbar electrochromic device, showing the four electrical connections with applied voltages and currents.

With reference to FIG. 8, for this 3-pane, 4-busbar IGU, Pane 1 still has applied voltage given by (V1-V2) and current I1. Pane 2 still can measure applied voltage as (V3-V2) but current is given by either (I2-I1) or (I4-I3). Pane 3 voltage is (V3-V4), with current (-I4).

Since multi-zone electrochromic devices have fully independent control of each zone, it is possible for the zones to be different in size or shape. For example, and with reference to FIG. 2, while each of zones 200A and 200B are depicted as having a generally rectangular shape, the subject matter disclosed herein provides that a plurality of zones, each having a selected shape, may be used. Further still, while multi-pane IGU 200 is depicted as having a generally rectangular shape, the subject matter disclosed herein provides that a multi pane IGU of any selected size and shape can be used.

Figure 5:
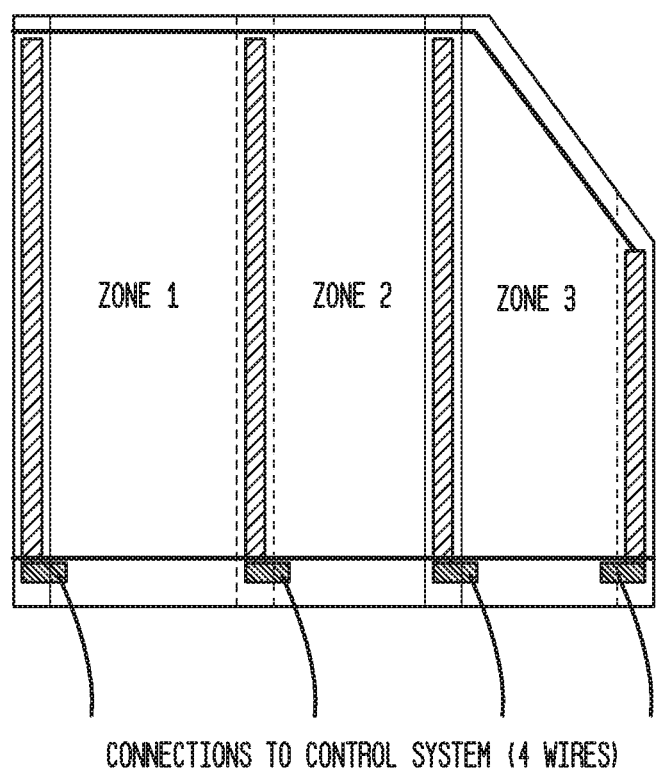
FIG. 5 depicts a three zone electrochromic device, and associated wiring, where one of the zones has a non-rectangular shape.

As a further non-limiting example, FIG. 5 shows busbar, 3-zone device in which the zones are different sizes (difference surface areas), and where one of the three zones is not rectangular in shape. For such devices, it is necessary to determine the appropriate voltage and current protocols to manage each individual sub-pane, and then the voltage may be controlled and current monitored as described above in order to manage each sub-pane with complete autonomy.

Because it is believed that the center bus bar (s) carry(ies) twice the current of the edge bus bars, it is possible to reduce the thickness or width of the edge bus bars to achieve half the conductivity of the center bus bar. Alternatively, all bus bars may be made consistently large enough to carry the full current.

In another aspect of the present invention, the electrochromic zones are formed from a single electrochromic coating on the substrate, wherein the single electrochromic coating is cut to form individual electrochromic zones. In some embodiments, the substrate comprises a first bus bar and a second bus bar, wherein the first bus bar runs continuously over each electrochromic zone. The second bus bar is segmented wherein each bus bar segment corresponds to an electrochromic zone. Each zone may be of a different size or shape, so long as it can be designed in such a way that a single bus bar traverses all zones along one side.

The segmented second bus bar may formed from a single bus bar (applied just as the first bus bar is applied) and cut to form individual bus bar segments. In an alternate embodiment, the segmented second bus is applied in segments or applied as a single bus bar that has one or more gaps.

Figure 6:
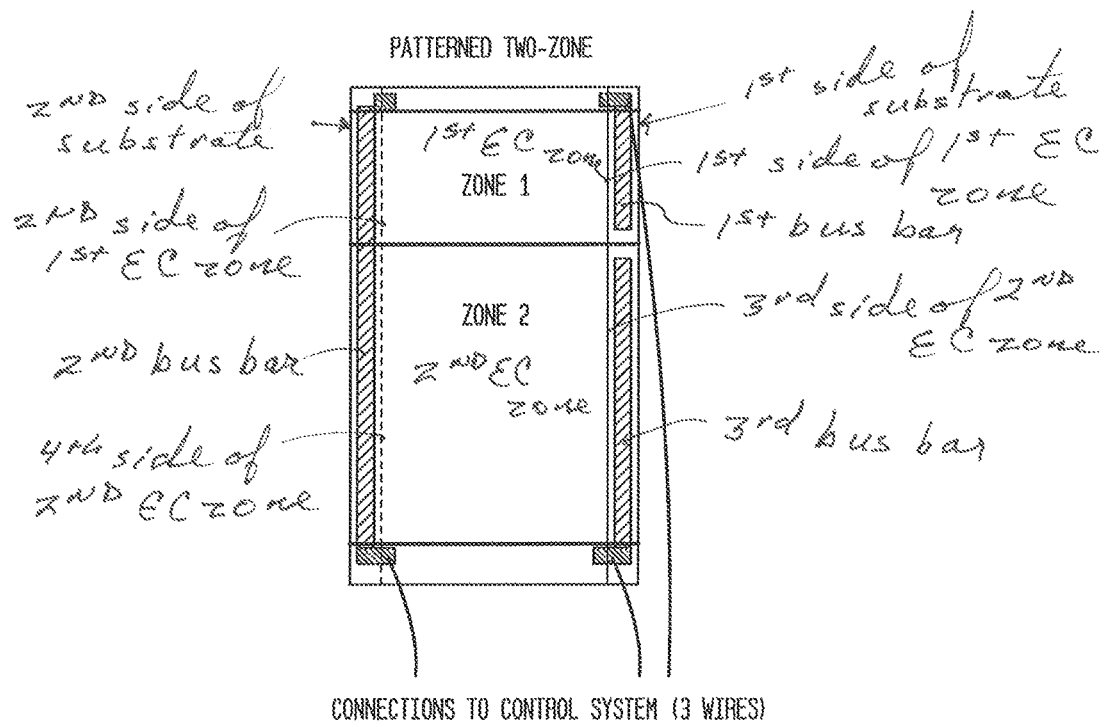
FIG. 6 depicts a two zone electrochromic device, and associated wiring, where the electrochromic device comprises a segmented bus bar.

Most of the processing (e.g. laser processing/cutting) is identical to a normal 2-busbar device. With reference to FIG. 6, however, there is an extra P4 cut which severs the films completely between the two operating zones, preventing any current flow between them. In addition, one of the bus bars is segmented. Electrically, this unit works just like a 3-busbar 2-zone device discussed previously, with one busbar connected to the bottom conductor of both zones, and two separate busbars connected to the top conductor of each zone. The control hardware and logic is identical to the 3-busbar case. Of course, the same logic applies to devices having more than two zones. In some embodiments, the substrate is a laminate. In some embodiments, the electrochromic zones comprise at least one thin film comprising a mixed tungsten-nickel oxide.

Figure 9:
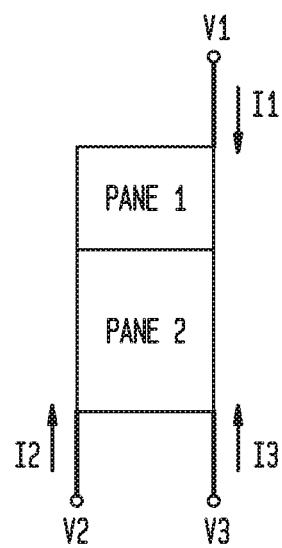
FIG. 9 depicts a 2-pane, isolation-zoned electrochromic device, showing the three electrical connections with applied voltages and currents.
Figure 10:
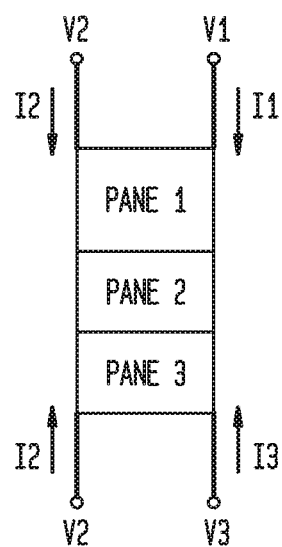
FIG. 10 depicts a 3-pane, isolation-zoned electrochromic device, showing the four electrical connections with applied voltages and currents.
Figure 11:
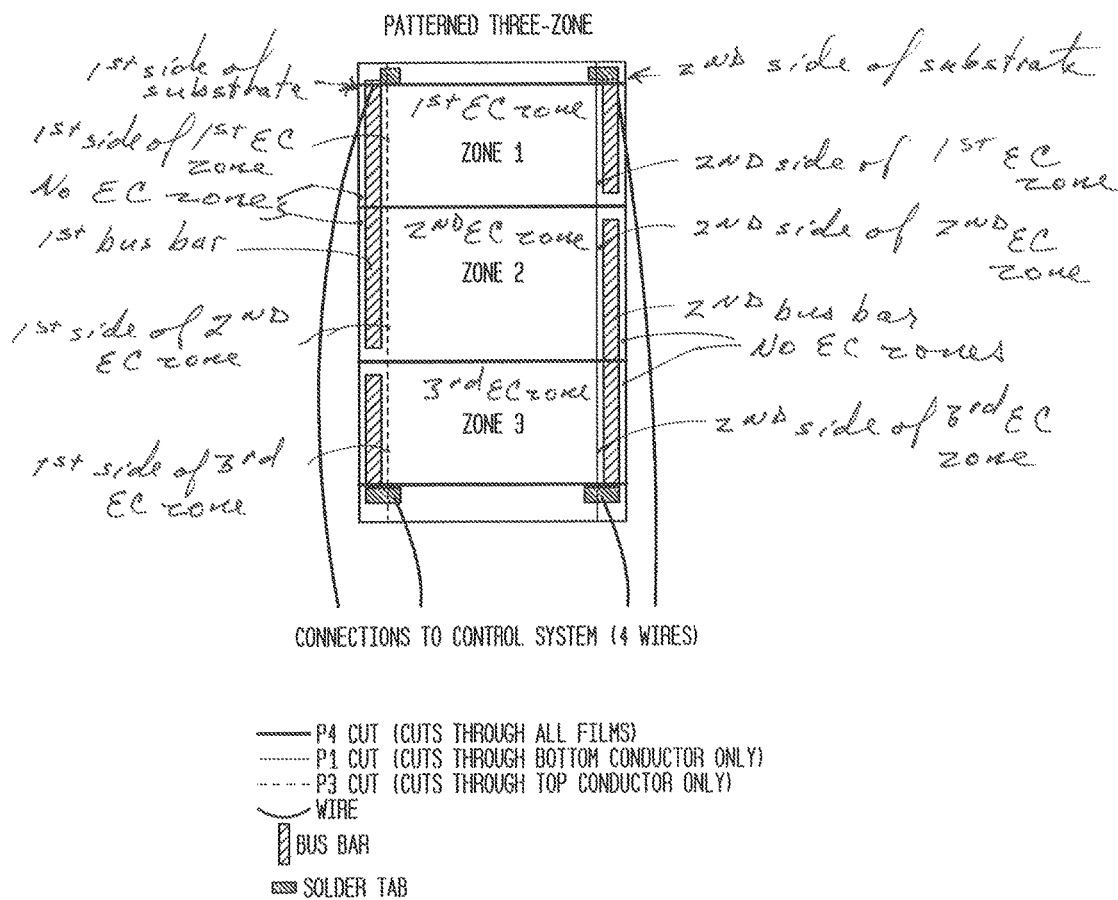
FIG. 11 provides a more detailed illustration of the 3-pane, isolation-zoned device, showing bus bar segments and laser isolating processes.

With reference to FIG. 9, for this 2-pane device having a segmented bus bar, Pane 1 has an applied voltage given by (V1-V2) and current I1, while Pane 2 has applied voltage of V3-V2 and current I3.

In another embodiment, the P4 laser process described above is used to cut the films into three regions, with bus bar segments along each edge bridging the pairs of adjacent zones. This embodiment, it is believed, has the advantage of permitting all connections to be made near corners instead of along edges, which can allow at least some more space for making connections. In addition, it is electrically comparable to the 4-busbar, 3-zone device, with the three zones connected electrically in series. In some embodiments, this permits fewer different controls/wiring configurations than if one bus bar spans all zones, with three separate segments on the opposite side.

In some embodiments, photochromic or thermochromic materials may be used in place or in addition to the electrochromic materials disclosed herein. For example, some zones my comprise electrochromic materials while other zones may comprise at least one of an electrochromic, photochromic, or thermochromic material. Suitable photochromic materials include, but are not limited to, triarylmethanes, stilbenes, azastilbenes, nitrones, fulgides, spiropyrans, naphthopyrans, spiro-oxazines, and quinones. Suitable thermochromic materials include, but are not limited to, liquid crystals and leuco dyes. Both photochromic and thermochromic materials can be formed on the substrate in a well-known manner. No bus bars would be needed for photochromic or thermochromic dynamic zones because light and heat respectively modulate the properties of the materials. One exemplary embodiment using photochromic and/or thermochromic dynamic zones could be a window having at least one electrochromic dynamic zone towards the top of the window that is actively controlled for daylighting and at least one photochromic dynamic zone towards the bottom of the window that self darkens when under direct light, and at least a second electrochromic zone posited in another region of the device.

Further, it should be understood that one exemplary embodiment of the subject matter disclosed herein can comprise a window, such as an architectural window, having a single pane, or lite, that comprises a plurality of independently controlled dynamic zones. Another exemplary embodiment of the subject matter disclosed herein comprises an IGU comprising multiple zones of electrochromic window on one pane and clear glass on the other pane. Yet another exemplary embodiment of the subject matter disclosed herein comprises an IGU comprising multiple zones of electrochromic window on one pane and a low-E, tinted, or reflective glass on the other pane. Still another exemplary embodiment of the subject matter disclosed herein comprises an IGU comprising multiple zones of electrochromic window on one pane of the IGU and a patterned or special glass on the other pane in which the patterning or features may match, compliment, and/or contrast the areas of dynamic zones on the first pane. It should be understood that the foregoing exemplary embodiments can be configured so that the lite comprising the plurality of dynamic zones is a clear lite, a low-E lite, a reflective, and/or partially reflective lite.

Those of ordinary skill in the art will recognize that any of the control, power, or wiring systems (including wireless control) described in copending application U.S. Ser. No. 13/354,863 may be adapted for use with a multi-zone electrochromic device as described herein.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

It is claimed:

1. An electrochromic device comprising:
    a substrate having a first side and a second side opposite the first side wherein the substrate is a part of an insulated glass unit;
    a first electrochromic zone having a first side and a second side opposite the first side, wherein the first side of the substrate is adjacent and closer to the first side of the first electrochromic zone than the second side of the first electrochromic zone, and the second side of the substrate is adjacent and closer to the second side of the first electrochromic zone than the first side of the first electrochromic zone;
    a second electrochromic zone having a third side and a fourth side opposite the third side, wherein the first side of the substrate is adjacent and closer to the third side of the second electrochromic zone than the fourth side of the second electrochromic zone, and the second side of the substrate is adjacent and closer to the fourth side of the second electrochromic zone than the third side of the second electrochromic zone;
    a first bus bar having a length extending along the first side of the substrate, being adjacent to the first side of the first electrochromic zone and electrically connected to the first electrochromic zone and a first terminal, wherein the first bus bar is not electrically connected to the second electrochromic zone;
    a second bus bar having a length extending along the second side of the substrate, being adjacent to the second side of the first electrochromic zone and the fourth side of the second electrochromic zone and electrically connected to the first and second electrochromic zones and a second terminal, wherein the second bus bar is a common bus bar for the first and second electrochromic zones; and
    a third bus bar having a length extending along the first side of the substrate, being adjacent to the third side of the second electrochromic zone and electrically connected to the second electrochromic zone and a third terminal, wherein the third bus bar is not electrically connected to the first electrochromic zone,
    wherein the first and second electrochromic zones are independently controllable, and the second side of the substrate is closer to the second bus bar than to each of the first and third bus bars, wherein the first bus bar, second bus bar, and third bus bar are deposited on the substrate and wherein the first bus bar, second bus bar, and third bus bar are spaced away from an edge of the substrate.

2. The electrochromic device of claim 1, wherein:
    the first electrochromic zone comprises a fifth side and a sixth side spaced apart from the fifth side, wherein each of the fifth and sixth sides is adjacent to the first and second sides of the first electrochromic zone, and no bus bar is electrically connected to the first electrochromic zone along the fifth or sixth side; and
    the second electrochromic zone comprises a seventh side and an eighth side spaced apart from the seventh side, wherein each of the seventh and eighth sides is adjacent to the third and fourth sides of the second electrochromic zone, and no bus bar is electrically connected to the second electrochromic zone along the seventh or eighth side.

3. The electrochromic device of claim 1, wherein the first bus bar is electrically connected to a first wire that is electrically connected to a first voltage terminal, the second bus bar is electrically connected to a second wire that is electrically connected to a second voltage terminal, and the third bus bar is electrically connected to a third wire that is electrically connected to a third voltage terminal.

4. The electrochromic device of claim 1, wherein the first and second electrochromic zones are in a coplanar arrangement on a single substrate.

5. An electrochromic device comprising:
    a substrate having a first side and a second side opposite the first side and comprising a first electrochromic zone, a second electrochromic zone, and a third zone, wherein:
        the second electrochromic zone is disposed between the first and third electrochromic zones;
        each of the first, second, and third electrochromic zones has a first side adjacent to the first side of the substrate and a second side adjacent to the second side of the substrate;
        the first, second, and third electrochromic zones are independently controllable;
    a first bus bar that is a first common bus bar electrically connected to the first and second electrochromic zones along the first sides of the first and second electrochromic zones, wherein the first bus bar has a length extending along the first side of the substrate and is not electrically connected to the third electrochromic zone, and no electrochromic zone is disposed between the first bus bar and the first side of the substrate;
    a second bus bar that is a second common bus bar electrically connected to the second and the third electrochromic zones along the second sides of the second and third electrochromic zones, wherein the second bus bar has a length extending along the second side of the substrate and is not electrically connected to the first electrochromic zone; and
    wherein the first bus bar and the second bus bar do not overlie each other, wherein the first bus bar and second bus bar are deposited on the substrate and wherein the first bus bar and the second bus bar are spaced away from an edge of the substrate.

6. The electrochromic device of claim 5, further comprising:
    a first wire and a first solder tab that electrically connects the first wire to the first bus bar; and
    a second wire and a second solder tab that electrically connects the second wire to the second bus bar.

7. The electrochromic device of claim 5, further comprising a third bus bar that is electrically connected to the first electrochromic zone along the second side of the first electrochromic zone, wherein the first electrochromic zone is the only electrochromic zone on the substrate electrically connected to the third bus bar.

8. The electrochromic device of claim 7, further comprising a fourth bus bar that is electrically connected to the third electrochromic zone along the first side of the third electrochromic zone.

9. The electrochromic device of claim 8, further comprising:

a first wire and a first solder tab that electrically connects the first wire to the first bus bar;

a second wire and a second solder tab that electrically connects the second wire to the second bus bar;

a third wire and a third solder tab that electrically connects the third wire to the third bus bar; and a fourth wire and a fourth solder tab that electrically connects the fourth wire to the fourth bus bar, wherein:

the first bus bar is not electrically connected to the third electrochromic zone, the second bus bar is not electrically connected to the first electrochromic zone, and the third electrochromic zone is the only electrochromic zone on the substrate electrically connected to the fourth bus bar; and the first, second, and third electrochromic zones are in a coplanar arrangement on the substrate.

10. The electrochromic device of claim 5, wherein the first, second, and third electrochromic zones are formed from a single electrochromic coating on the substrate.

11. An insulated glazing unit comprising the electrochromic device of claim 5.

12. The electrochromic device of claim 5, wherein no electrochromic zone is disposed between the second bus bar and the second side of the substrate.

* * * * *

UNITED STATES PATENT AND TRADEMARK OFFICE
CERTIFICATE OF CORRECTION

PATENT NO.         : 10,268,097 B2
APPLICATION NO.    : 15/075842
DATED              : April 23, 2019
INVENTOR(S)        : Bryan D. Greer It is certified that error appears in the above-identified patent and that said Letters Patent is hereby corrected as shown below:

In the Specification

Column 10, Line 8, please delete "243", and insert --248--
Column 10, Line 27, please delete "+57", and insert --+5V--
Column 10, Line 32, please delete "37", and insert --3V--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*